(12) United States Patent
Le et al.

(10) Patent No.: US 7,941,470 B2
(45) Date of Patent: May 10, 2011

(54) SYNCHRONIZATION AND CUSTOMIZATION OF A CLONE COMPUTER

(75) Inventors: Bich Cau Le, San Jose, CA (US); Ji Feng, Cupertino, CA (US); Sirish Raghuram, Sunnyvale, CA (US); Yufeng Zheng, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 341 days.

(21) Appl. No.: 12/058,269

(22) Filed: Mar. 28, 2008

(65) Prior Publication Data
US 2008/0244028 A1  Oct. 2, 2008

Related U.S. Application Data

(60) Provisional application No. 60/920,847, filed on Mar. 28, 2007.

(51) Int. Cl.
*G06F 13/00* (2006.01)

(52) U.S. Cl. .......................... 708/208; 709/224; 709/248
(58) Field of Classification Search .................. 709/208, 709/209, 211, 223, 224, 248; 719/325
See application file for complete search history.

(56) References Cited

U.S. PATENT DOCUMENTS

| | | | |
|---|---|---|---|
| 6,728,898 B2* | 4/2004 | Tremblay et al. | 714/6 |
| 7,712,094 B2* | 5/2010 | Shapiro | 717/175 |
| 7,735,051 B2* | 6/2010 | Van Huben et al. | 716/104 |
| 2002/0147635 A1* | 10/2002 | Lawson | 705/14 |

* cited by examiner

*Primary Examiner* — Viet Vu

(57) ABSTRACT

A computer implemented method for maintaining synchronization between a master computer disk and a clone disk that includes cloning the clone disk from the master computer disk, the clone disk having a customization portion; and customizing the customization portion with information relevant to a clone computer that uses the clone disk.

20 Claims, 8 Drawing Sheets

SYNCHRONIZATION AND CUSTOMIZATION OF A CLONE COMPUTER

This application claims the benefit of U.S. Provisional Application No. 60/920,847, filed Mar. 29, 2007, which provisional application is incorporated herein by reference in its entirety.

FIELD OF THE INVENTION

One or more embodiments of the present invention relate to synchronization and customization of a clone computer.

BACKGROUND

Presently, in many cases, a single computing system, such as a desktop machine, a laptop machine, a terminal, a virtual machine, and the like is used by a single user or a few users. For example, in an office environment, each employee typically has his/her own computing system. However, even in shared computing environments it is common to have different logon capabilities to differentiate among users.

Usually, an individual computing system includes customized user preferences directed toward the computing system and the user or owner thereof. In a general case, customization of the computing system includes a system name, an IP address, and the like. In addition, user preferences can include screen resolution, toolbar characteristics, specific software preferences, and the like.

In a large environment, an upgrade or initial purchase of a computing system requires loading an operating system (OS) and applications, and insuring interoperability. Additionally, with continuing advances in computing systems, it is not uncommon for a user to upgrade his/her computing system every couple of years. In either case, one method for quickly enabling a new computing system is a method known as computer cloning.

Computer cloning can be used to provide independent computing environments for a large number of users that have similar software needs, but who desire isolation provided by running separate computers. Computer cloning is appealing to a computer administrator because it promises to solve a plurality of software maintenance problems as well as to reduce overall installation and set-up time, i.e., when software of a template computer is updated, cloning infrastructure can, in theory, automatically apply the update to all clone computers derived from that template computer.

Software for a typical computer is usually stored on a disk, and the disk also typically contains the computer's network settings, such as host name, security identifier, and IP address (es). Consequently, computer cloning often involves cloning computer disks. Once a clone disk is created, it is attached to physical or virtual hardware, resulting in a computer that is capable of powering on and performing useful tasks. However, because clone disks typically do not include customized settings, additional resources and time must be provided for updating or reinstalling customized settings after cloning has occurred. Without updating the customized settings, each and every updated clone computing system would again answer to the same computer name, IP address, and the like. In addition, any personal user settings would be removed. This would frustrate users who must again spend time re-personalizing and re-customizing their computers. This problem is exacerbated when disk changes occur on a routine basis.

SUMMARY

One embodiment of the present invention is a computer implemented method for maintaining synchronization between a master computer disk and a clone disk that comprises: (a) cloning the clone disk from the master computer disk, the clone disk having a customization portion; and (b) customizing the customization portion with information relevant to a clone computer that uses the clone disk.

DETAILED DESCRIPTION

Figure 1:
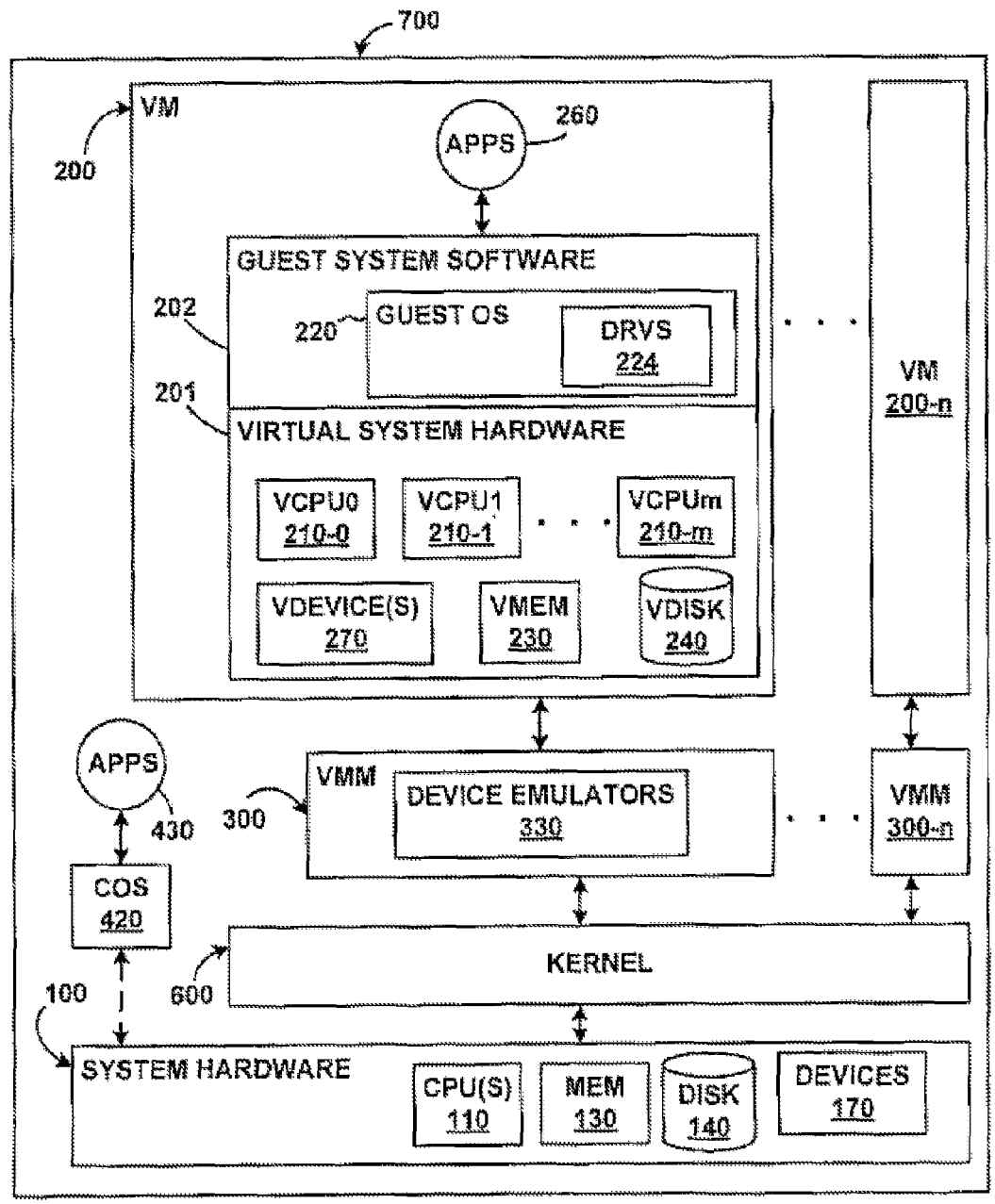
FIG. 1 is a block diagram of one embodiment of a virtualized computer system that can be used to implement one or more embodiments of the present invention may be practiced.

One or more embodiments of the present invention are methods and systems for maintaining synchronization between a master (or template) disk and one or more clone (or primary) disks (where the clone (or primary) disk contains software programs, for example and without limitation, operating systems, drivers, applications, and the like) of one or more clone computers by synchronizing and customizing the master (or template) disk to the clone (or primary) disks. The clone computers may be physical or virtual computers (virtual computers and systems are discussed below in the Appendix in conjunction with FIG. 1). Further, in accordance with one or more further embodiments, synchronizing the master (or template) disk includes maintaining a customization portion for the clone (or primary) disk. Still further, in accordance with one or more still further embodiments, one or more of the clone computers store data, for example, clone computer user data, in a network file system or on private data disks that are not affected by the operations of synchronizing and customizing. In accordance with one or more such still further embodiments, the clone computer user data are stored in a local file system residing on a second disk attached to the clone computer, referred to herein as a data disk, which data disk is persistent across operations of synchronizing and customizing. Storing clone computer user data on a second disk attached to the clone computer provides one or more advantages over storing such data in a network file system. First, the attached second disk requires no network connectivity to access the data, while the network file system requires network connectivity to access the data. Second, some operating systems do not allow certain types of encrypted files to reside on a network file system, and this may limit the storage of data in the network file system. Because the data disk is not cloned, as is the clone (or primary) disk, in accordance with one or more embodiments, the data disk may be implemented as a full disk versus a snapshot of a disk. Although, the data disk may be a full disk, it is still useful to use a snapshot function to create lightweight backups of the data disk, with each snapshot representing a particular point in time in the disk's history. For example, backing up old versions of data is useful to rectify a situation, for example and without limitation, where a user accidentally deletes a personal file.

In accordance with one or more embodiments of the present invention, clone (or primary) disks are created from a master (or template) disk by leveraging copy-on-write snapshot or fast disk copy features of storage hardware and virtual machine technology. Next, the clone (or primary) disks are customized, for example and without limitation, in an agent-less manner by directly modifying their contents before the clone computers are powered on. Alternatively, in accordance with one or more further embodiments, customization can be performed after power-on by injecting customization parameters into the clone disks through a communications channel such as, for example and without limitation, a virtual machine's backdoor device. In addition to personalizing typical network settings, and in accordance with one or more embodiments, customization can also reconfigure software driver settings to allow software to boot on a hardware platform different from a master computer hardware platform. In addition, one or more still further embodiments of the present invention are methods for tracking changes to the master (or template) disk for synchronization. In other words, whenever a new revision of the master (or template) disk is deemed fit for redeployment, one or more such still further embodiments of the present invention synchronize each clone (or primary) disk with a copy of the new master (or template) disk, and re-customize the clone (or primary) disk. In accordance with one or more such still further embodiments, in order for the synchronization operation to be safe, clone (or primary) disks that are currently busy (for example, in use by active clone computers) are detected, and notifications to shut down are sent to users and/or software of those computers before replacing the clone (or primary) disks.

Figure 2:
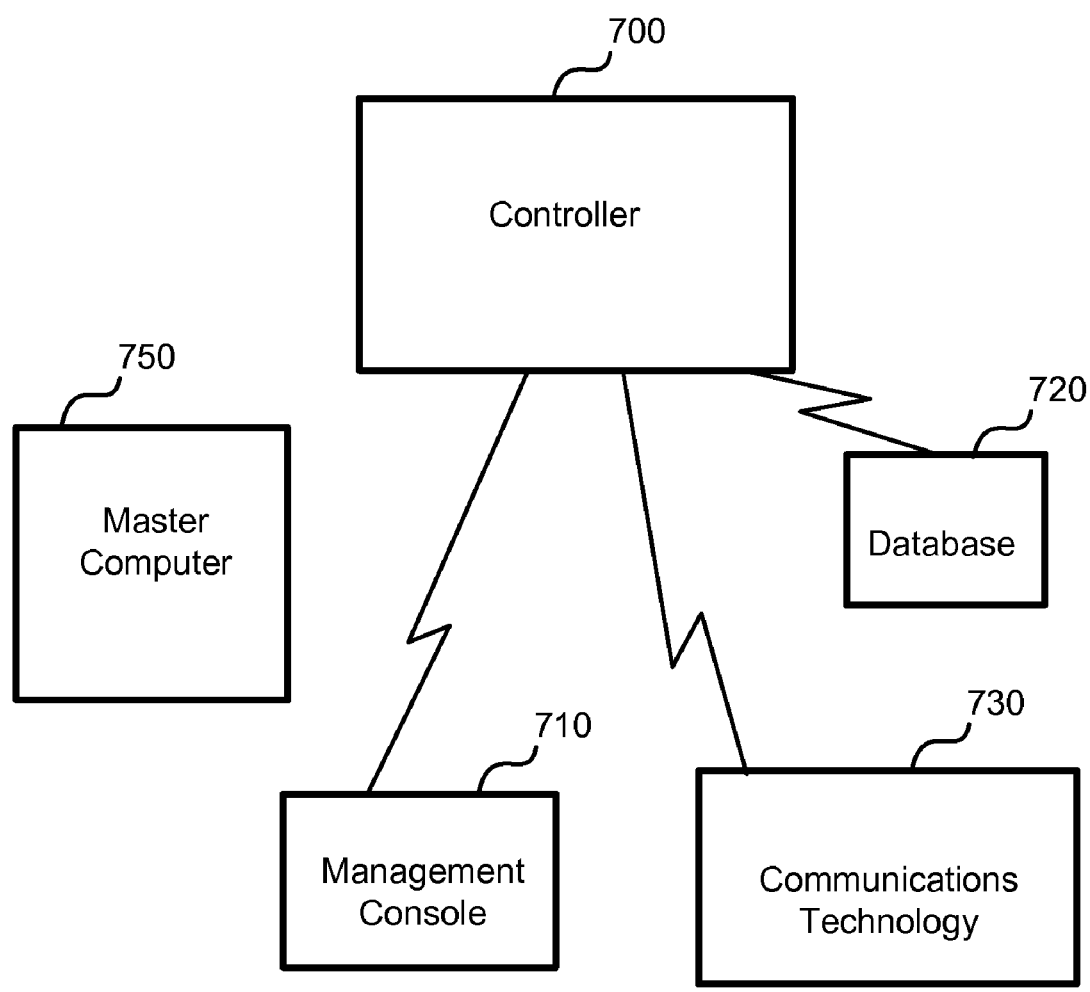
FIG. 2 shows a block diagram of a controlling computer system that can be used to implement one or more embodiments of the present invention.

FIG. 2 shows a block diagram of controlling computer system 400 that can be used to implement one or more embodiments of the present invention. In accordance with one or more such embodiments of the present invention, controlling computer system 400 includes: (a) controller 700 and management console 710 with master (or template) disk/ clone disk synchronization/customization system software (including disk driver(s) and file system driver(s)) ("controller software") hosted by controller 700; (b) database 710; and (c) master computer(s) 750. A preferred embodiment of controller 700 is a software program running on computer hardware associated with controlling computer system 400. It should be understood that controller 700 of FIG. 2 is exemplary only, and that one or more embodiments of the present invention can operate on or within any number of different computer systems including general purpose networked computer systems, embedded computer systems, routers, switches, server devices, client devices, various intermediate devices/nodes, stand alone computer systems, portable computer systems, network interface cards, and the like. In addition, in general, controller 700 of FIG. 2 is also capable of incorporating any or all of the components of FIG. 1 described in the Appendix. That is, controller 700 may also include virtual functionality and components as described in FIG. 1. For example, controller 700 is suited to having a para-virtualization device that allows a host virtual machine monitor or a hypervisor to communicate with software running in the computer over a virtual channel.

As shown in FIG. 2, controller 700 interfaces with management console 710, database 720, communications technology 730, and master computer(s) 750. Management console 710 may be implemented utilizing any one of a number of technologies for interacting with a computer system that are well known to those of ordinary skill in the art; database 720 may be implemented utilizing any one of a number of database technologies that are well known to those of ordinary skill in the art; communications technology 730 may be implemented utilizing any one of a number of technologies for communicating among computer systems and storage systems that are well known to those of ordinary skill in the art; and master computer(s) 750 may be implement in a manner that will be described in detail below.

In accordance with one or more such embodiments of the present invention, controller 700 manages a synchronization/customization framework by maintaining master (or template)-clone relationships, and coordinating operations of synchronizing and customizing. In accordance with one or more such embodiments, database 720 stores a persistent state needed for managing the framework. In particular, in accordance with one or more such embodiments, the database contains entries for: (a) logical computers; (b) clone groups; (c) computer management system (CMS) and storage management system (SMS) information; (d) policies; (e) permissions; and (f) offline customizers (if any). As the term is used here, a logical computer is an abstraction. In particular, there are two types of logical computers: (a) a master (or template) computer, and (b) a clone computer. In accordance with one or more embodiments of the present invention, a master (or template) computer entry in the database contains an identifier for a master (or template) disk that contains software (for example and without limitation, an operating system and possibly applications) and network settings, which master (or template) disk is bootable by an actual computer. In addition, in accordance with one or more such embodiments, a directed and acyclic revision graph of, for example and without limitation, snapshot references representing point-in-time states of the master (or template) disk is associated therewith. A snapshot reference identifies a disk snapshot that contains software (operating system and applications) and system configuration files where the format and value of such snapshot references are usually decided by the CMS/SMS used by controller 700. A snapshot reference can be, for example and without limitation, a unique identifier of a LUN, an ID of a particular snapshot on a particular disk array, or a name of a virtual machine disk snapshot. In general, master (or template) computer entries in the database have a master (or template) disk identifier, while clone computer entries do not (clone computers receive a copy of a master (or template) computer's master (or template) (sometimes also referred to as a primary) disk during synchronization). In accordance with one or more embodiments of the present invention, offline customizer(s) (if offline customization is used) include at least one offline customizer computer set up to perform offline customization (as will be set forth in detail below). In accordance with one or more such embodiments of the present invention, an offline customizer computer may be controlling computer system 400. In accordance with one or more embodiments of the present invention, permissions may be set up and administered by a system administrator. In accordance with one or more such embodiments of the present invention, an authentication domain controller (optional) provides authentication and directory services to clone and master (or template) computers.

In accordance with one or more embodiments of the present invention, a clone computer entry in the database contains: (a) identifiers for one or more data (or secondary) disks that contain primarily data and user settings for the clone computer (data (or secondary) disk identifiers are used when synchronizing requires recreating a virtual machine—in such a case, the clone (or primary) disk may point to data on the secondary disk, and the identifier is needed to finalize recreation of the clone (or primary disk)); (b) a reference to an actual computer (which actual computer can either be a physical computer or a virtual computer) where the format and value of the reference is determined by the CMS/SMS used by controller 700; (c) customization properties specific to the clone computer, including, for example and without limitation: (i) hostname; (ii) IP address(es); (iii) security identifiers; (iv) authentication domain membership; and (v) software license keys (note, that each of the customization properties can be static or dynamic—where static means that a property's value is fixed and specified by a system administrator, and dynamic means that a property's value is computed at customization time based on rules set by the system administrator (for example, the hostname could be set from a rule "hostname=clone_group_name+clone_index", which means: set the clone computer's hostname to the name of its group concatenated with the clone computer's numerical position within its group)).

A clone group (CG) entry in the database represents a set of clone computers that are all derived from the same master (or template) disk. In accordance with one or embodiments of the present invention, a CG entry contains: (a) a list of references to clone computer entries belonging to the clone group; and (b) an anchor, (for example and without limitation, a reference to a snapshot revision in a revision graph of a particular master (or template) computer to which the clone computers are synchronized—the anchor can be configured to be fixed (i.e., where the anchor does not change unless the system administrator explicitly points it at a new master (or template) snapshot revision) or floating (i.e., where the anchor tracks a current (i.e., most up-to-date), stable, snapshot revision of a branch of the revision graph in which it resides)—the anchor can change if a new snapshot revision is added to the end of the branch.

In accordance with one or more embodiments of the present invention, a system administrator can specify a backup policy in the database for a group of clone computers, or for individual clone computers. The backup policy determines whether the clone (or primary) disk of the clone computer is backed up during re-synchronization. Backing up a clone computer's clone (or primary) disk protects against accidental loss of data or software that a user might mistakenly have saved to the clone (or primary) disk instead to a secondary disk or the network. In accordance with one or more such embodiments, the backup policy has a numerical setting N that indicates how many backups should be kept. At any given time, the controller keeps track of up to N copies of clone (or primary) disks associated with the clone computer, where $N \geq 1$—such backups may be stored in accordance with any one of a number of methods that are well known to those of ordinary skill in the art such as, for example and without limitation, on the clone computer, on network storage accessible by the clone computer, on network storage accessible by controller 700, and so forth. In accordance with one or more such embodiments, when a new clone (or primary) disk is generated, and N backups already exist, controller 700 deletes the oldest one. The value N=1 means that there are no backups, and only the latest clone (or primary) disk snapshot is kept. In accordance with one or more embodiments, and in accordance with any one of a number of methods that are well known to those of ordinary skill in the art, management console 710 enables the system administrator to browse a list of clone (or primary) disk backups, and the system administrator can choose to switch the clone (or primary) disk to a particular version that is still available in the set of N backups. As one can readily appreciate, there is no need to customize the earlier clone (or primary) disk, since it was customized when it was first synchronized.

CMS and SMS entries in the database contain information necessary to communicate with the CMS/SMS, such as, for example and without limitation, account name, password, and CMS/SMS network address. A CMS is a subsystem that manages pools of compute resources, and is typically comprised of a collection of software elements. As is known, some CMS products also manage software running inside managed computers. As is also known, a unit of compute resource, or a computer, typically includes one or more CPUs, memory, and communications hardware (for example, network communications hardware). The compute resources can be physical (for example, real computers, network interface cards, network cables, and random access memory), or the compute resources can be virtual. A virtual computer, when active, consumes physical compute resources, so a CMS that supports virtual machines generally manages physical resources as well, and maintains virtual-to-physical hardware mappings. While some CMSs specialize in virtual machine management, others can manage both physical and virtual computers. Most CMSs expose their management services through a software interface that allows another program, such as controller 700, to control compute resources through the CMS. Typical services exposed by a CMS include hardware operations such as, for example: (a) discovery and inventory of compute resources; (b) creation or allocation of compute resources; (c) powering a computer on or off; (d) remote control and health monitoring; (d) network management of switches and ports; and (e) the like. It is also common for a CMS to provide services for monitoring and controlling software running inside managed computers. In general, such services include, but are not limited to: (a) monitoring and inventory of installed software applications; (b) rebooting and shutting down an operating system; (c) software delivery, such as applying a patch; and (d) the like. An SMS is a subsystem that manages pools of storage resources, such as, disk arrays, network-attached storage (NAS) filers, and networks that connect them to each other but also to compute resources. Similar to a CMS, an SMS can manage physical storage elements, virtual storage elements (such as virtual disks), or both. An SMS typically exposes interfaces to: (a)

provision new storage, such as, to create a new logical unit (LUN) from a storage pool; (b) create or delete a virtual disk; (c) manage disk snapshots; (d) manage (e.g., enable/disable) data paths among storage devices, computers, and network switches; and (e) the like. Note that one or more embodiments of the present invention may be integrated into an existing CMS or SMS, or a combined CMS/SMS.

A policy entry in the database may include: (a) a synchronization notification policy (for example and without limitation, whether and how users of active clone computers should be notified when their computer is subject to resynchronization); (b) a backup policy (for example and without limitation, how many backups of a clone computer's clone (or primary) disk to keep, and whether to back up a clone computer's data (or secondary) disks); and (c) other policies.

In accordance with one or more embodiments of the present invention, an offline customizer computer is used if the system administrator's policies dictate the use of offline customization. For example and without limitation, these entries may identify actual computers that participate in customization.

In accordance with one or more embodiments of the present invention, management console 710 provides a user interface to controller 700, database 720, and master computer(s) 750. In particular, management console 710, in accordance with any one of a number of methods that are well known to those of ordinary skill in the art, enables a system administrator, for example and without limitation, to: (a) set up and set policies and permissions; (b) create, delete and manage master (or template) and clone disks; (c) create, allocate, or register actual computers; (d) associate an actual computer with a master (or template) or clone computer; (e) browse revision graphs of master (or template) computers; (f) activate a master (or template) or clone computer by powering on the actual computer associated with it, thereby enabling a user to modify the disk state corresponding to the computer's current revision; and (g) synchronize and deploy a clone group from a master (or template).

In accordance with one or more embodiments of the present invention, if offline customization (to be described in more detail below) is to be used, in accordance with any one of a number of methods that are well known to those of ordinary skill in the art, one or more disk drivers may be used to expose a particular disk or disk snapshot to an offline customizer computer so that it can temporarily mount the disk's file systems and manipulate their files. Examples of disk drivers include, without limitation: an HBA (host bus adapter) driver of a SCSI Fibre Channel card; an iSCSI initiator driver for connecting to iSCSI devices; and a virtual disk driver that exposes a virtual disk as a block device to a computer. A need to supply disk drivers in implementing one or more embodiments of the present invention depends on capabilities of operating systems loaded on offline customizer computers. For example, while many operating systems include HBA drivers and iSCSI initiator drivers, few include virtual disk drivers.

In accordance with one or more embodiments of the present invention, controller 700 can bind a logical computer's current snapshot to actual computer hardware (physical or virtual) to produce a runnable computer using any one of a number of methods that are well know to one of ordinary skill in the art so that, when the actual computer is powered on, software contained on the snapshot is loaded into the computer's memory, and the logical computer is said to be active. However, in accordance with one or more embodiments of the present invention, the actual computer of a logical computer can be changed (i.e., by updating the database) any time the logical computer is inactive.

Figure 4A:
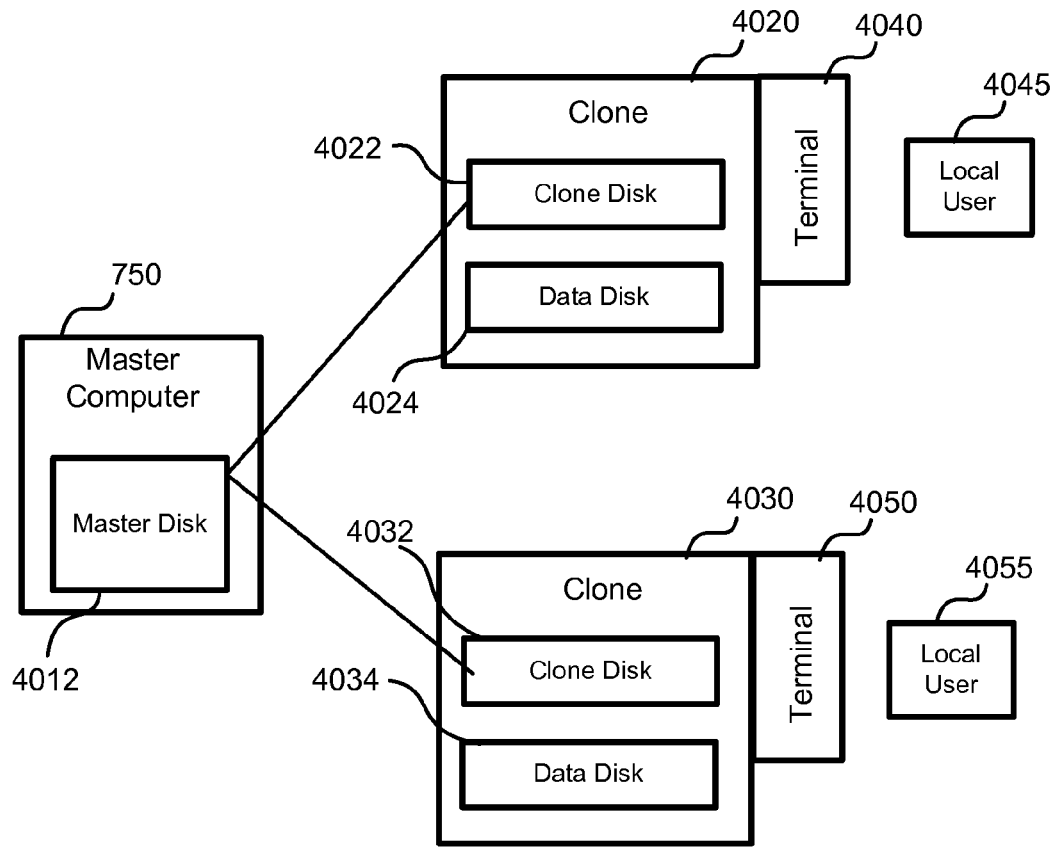
FIG. 4A is a schematic block diagram depicting a portion of a controller/clone synchronization and customization system that operates in accordance with one or more embodiments of the present invention wherein clone computers and their users reside in one data center.

FIG. 4A is a schematic block diagram depicting a portion of controller/clone synchronization and customization system 4000 that operates in accordance with one or more embodiments of the present invention wherein clone computers and their users reside in one data center. For example, as shown in FIG. 4A, users access clone computers 4020 and 4030 directly through terminals 4040 and 4050, respectively, using, for example and without limitation, a local mouse, keyboard and screen (MKS). As further shown in FIG. 4A: (a) master computer 750 has access to master (or template) disk 4012; (b) clone computer 4020 includes clone (or primary) disk 4022 and data disk 4024; and (c) clone computer 4030 includes clone (or primary) disk 4022 and data disk 4024.

Figure 4B:
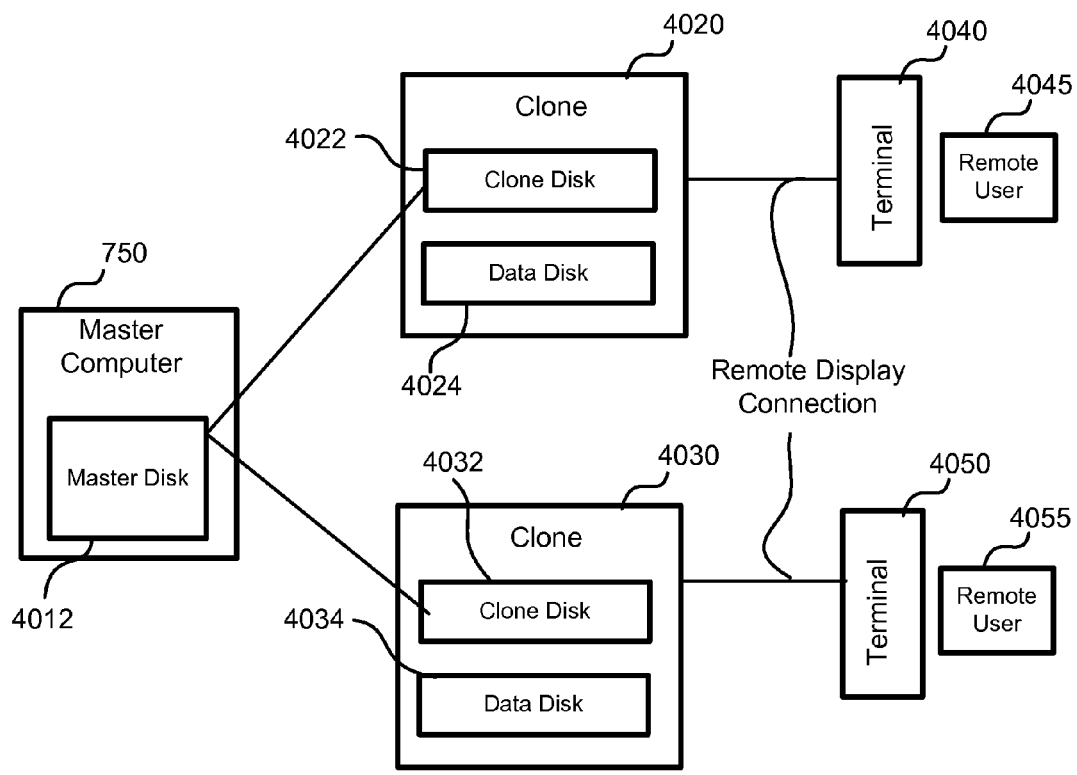
FIG. 4B is a schematic block diagram depicting a portion of a controller/clone synchronization and customization system that operates in accordance with one or more embodiments of the present invention wherein remote users access their clone computers through a mouse, keyboard and screen (MKS) provided by a terminal.

FIG. 4B is a schematic block diagram depicting a portion of controller/clone synchronization and customization system 4250 that operates in accordance with one or more embodiments of the present invention wherein remote users access their clone computers, for example and without limitation, through a mouse, keyboard and screen (MKS) provided by a terminal. As shown in FIG. 4B, remote users 4045 and 4055 utilize remote terminals 4040 and 4050, respectively, to communicate with clone computers 4020 and 4030, respectively, through a network MKS such as a VNC (virtual network computing) or an RDP (remote desktop protocol). As further shown in FIG. 4B: (a) master computer 750 has access to master (or template) disk 4012; (b) clone computer 4020 includes clone (or primary) disk 4022 and data disk 4024; and (c) clone computer 4030 includes clone (or primary) disk 4032 and data disk 4034. Note the following. First, the network link between local clone computers 4020 and 4030 and remote terminals 4040 and 4050, respectively, must be "up" for users to access their computers, for example, a network outage could disrupt a user's ability to do work. Second, if a user's terminal is a program (for example, Microsoft's Remote Desktop Client) running on a computer (for example, a home PC) that is more powerful than the clone computer at the data center, the user would not be able to take advantage of any such additional performance capability since all computation actually happens on the clone computer.

Figure 4C:
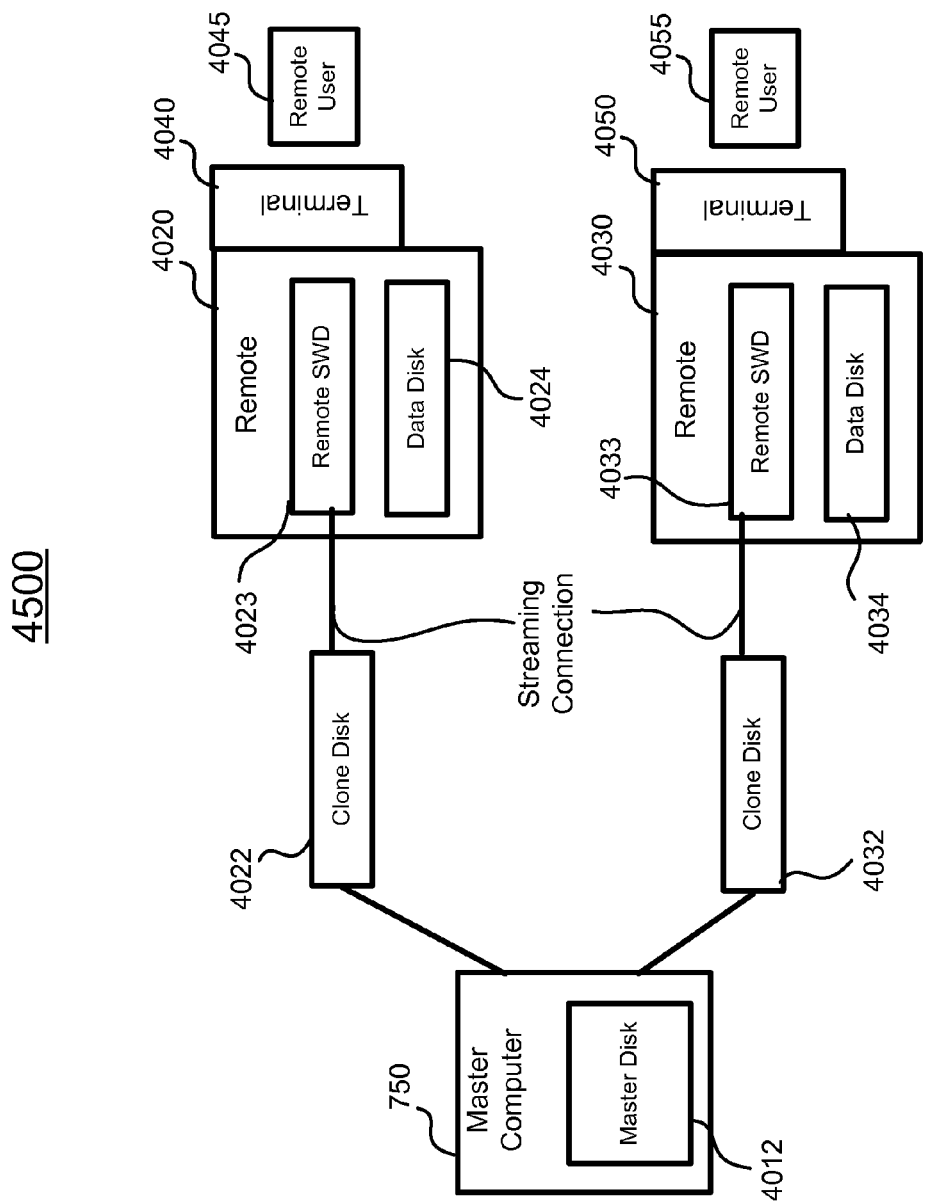
FIG. 4C is a schematic block diagram depicting a portion of a controller/clone synchronization and customization system that operates in accordance with one or more embodiments of the present invention wherein local clone disks are not attached to local computer hardware.

Finally, FIG. 4C is a schematic block diagram depicting a portion of controller/clone synchronization and customization system 5000 that operates in accordance with one or more embodiments of the present invention wherein local clone (or primary) disks, i.e., software disks 4022 and 4032 are located in a data center, but they are not attached to local computer hardware. Controller/clone 5000 addresses the issues discussed above. As shown in FIG. 4C, remote users 4045 and 4055 utilize terminals 4040 and 4050, respectively, to communicate with remote clone computers 4020 and 4030, respectively. As further shown in FIG. 4C: (a) master computer 750 has access to master (or template) disk; (b) clone computer 4020 includes remote clone (or primary) disk 4023 and data disk 4024; and (c) clone computer 4030 includes remote clone (or primary) disk 4033 and data disk 4034. An additional technology, disk streaming and caching, may be used to synchronize the local clone disks (i.e., remote software disk 4022 and remote software disk 4024) attached to the users' remote computers with software disks 4022 and 4024. The disk streaming and caching technology alleviates an issue related to network downtime by allowing remote clone computers 4020 and 4030 to continue functioning if sectors (blocks) of data it is accessing are present in a cache. Such disk streaming and caching technology is well known in the art, and is not further described herein for purposes of brevity and clarity. This configuration also may resolve the issue relating to performance, since computation occurs on the user's home computer.

Two clone computers are shown in FIGS. 4A-4C for purposes of brevity and clarity. It should be understood that embodiments of the present invention are suited to more or fewer clone computers, and are also suited to a plurality of groups of computing systems wherein each group has a master and at least one clone disk. In other words, the number of clone computers is not limited to two. Moreover, the number of groups of systems such as system 4000 that may be configured within a single location or a plurality of locations is also not limited herein. Also note that: (a) the computer hardware (for example, RAM, network adapter, disk adapter, etc.) can be either physical or virtual; (b) the computer disks can be either physical or virtual where the actual data are stored on storage devices, such as, for example and without limitation, locally attached disks, networked disk arrays, and network-attached storage (NAS) files; (c) networks and busses that interconnect computer hardware components and disks include, for example and without limitation, IP (internet protocol) networks, and storage area networks (SAN), and (d) software running on the computers includes management servers.

Figure 5A:
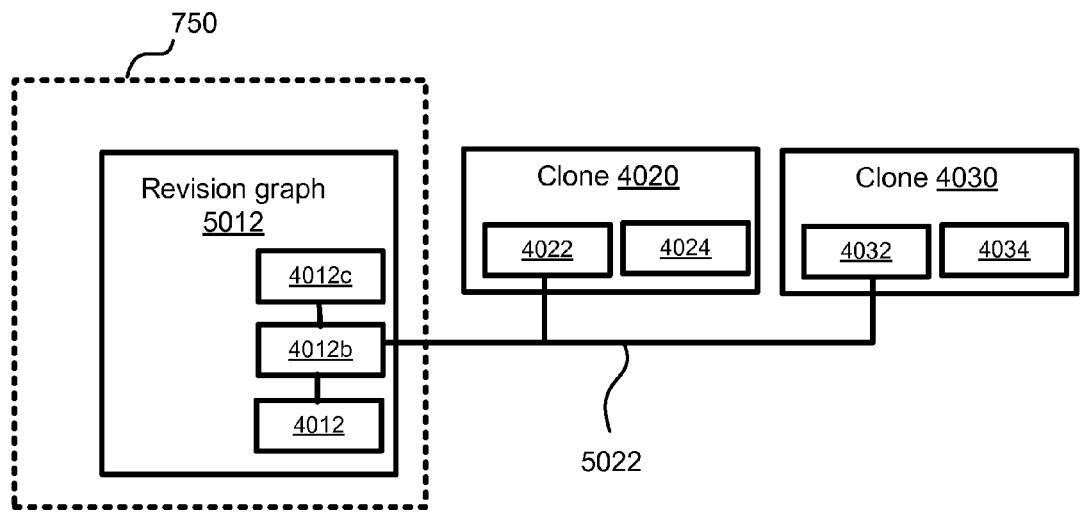
FIG. 5A is a schematic block diagram depicting a portion of a controller/clone synchronization and customization system that operates in accordance with one or more embodiments of the present invention wherein a controller includes access to a revision graph that is used for tracking changes to a master (or template) disk in accordance with one or more embodiments of the present invention.

FIG. 5A is a schematic block diagram depicting a portion of controller/clone synchronization and customization system 5000 that operates in accordance with one or more embodiments of the present invention wherein master computer 750 has access to revision graph 5012 that may be used for tracking changes to a master (or template) disk in accordance with one or more embodiments of the present invention. As shown in FIG. 5A, master (or template) revision graph 5012 shows initial master (or template) disk 4012, a first revision to disk 4012, i.e., disk 4012*b*, and a second revision to disk 4012, i.e., disk 4012*c*. As further shown in FIG. 5A, anchor 5022 tracks a current, stable, snapshot revision of a branch of master (or template) revision graph 5012. As described herein, anchor 5022 is used for synchronizing between a current active version of disk 4012, i.e., disk 4012*b*, accessed by controller 4010 and clone (or primary) disks in clone computers 4020 and 4030 (i.e., clone (or primary) disks 4022 and 4032, respectively). In accordance with one or more embodiments of the present invention, initially, anchor 5022 points to (or identifies) master (or template) disk 4012. Then, anchor 5022 is updated as revisions to master (or template) disk 4012 are configured, tested and deemed ready for deployment. For example, in accordance with one or more embodiments, as shown in FIG. 5A, anchor 5022 has not yet been updated to point to (or identify) newest version 4012*c* because version 4012*c* is being built, edited, debugged, or the like.

Figure 5B:
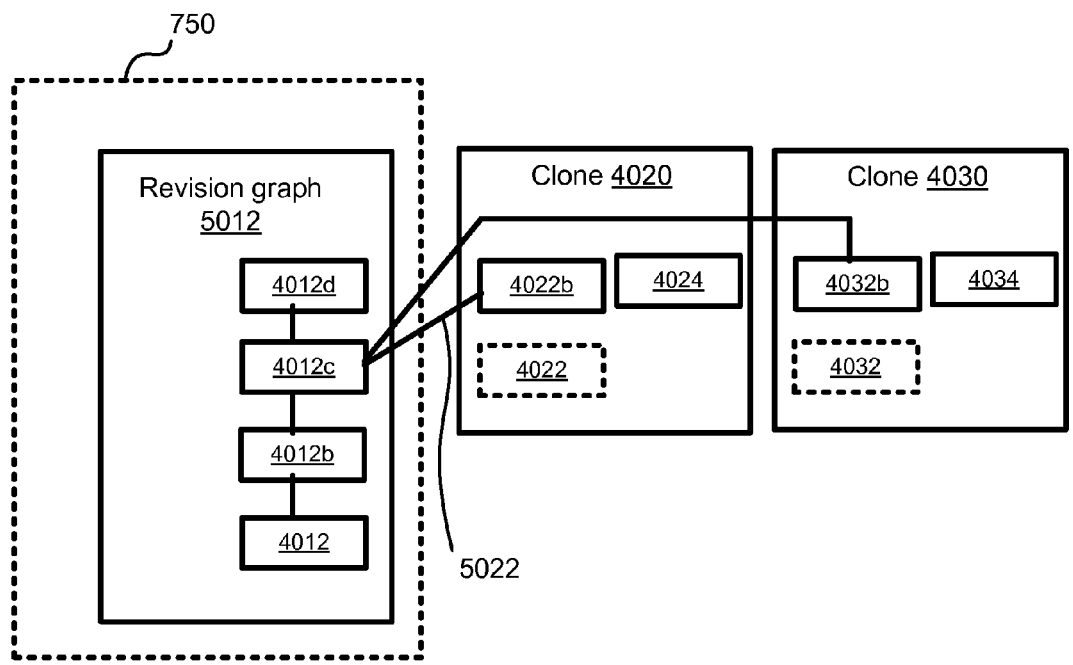
FIG. 5B is a schematic block diagram depicting a portion of a controller/clone synchronization and customization system that operates in accordance with one or more embodiments of the present invention wherein a controller includes access to a revision graph that is used for tracking changes to a master (or template) disk in accordance with one or more embodiments of the present invention, and wherein optional previous version backup storage for a clone computer is used in accordance with one or more embodiments of the present invention.

FIG. 5B is a schematic block diagram depicting a portion of controller/clone synchronization and customization system 5500 that operates in accordance with one or more embodiments of the present invention wherein master computer 750 has access to revision graph 5012 that may be used for tracking changes to a master (or template) disk in accordance with one or more embodiments of the present invention. As shown in FIG. 5B, master (or template) revision graph 5012 shows initial master (or template) disk 4012, a first revision to disk 4012, i.e., disk 4012*b*, a second revision to disk 4012, i.e., disk 4012*c*, and a third revision to disk 4012, i.e., disk 4012*d*. As further shown in FIG. 5B, anchor 5022 tracks a current, stable, snapshot revision of a branch of master (or template) revision graph 5012. As described herein, anchor 5022 is used for synchronizing between a current active version of disk 4012, i.e., disk 4012*c*, accessed by controller 4010 and software disks in clone computers 4020 and 4030 (i.e., clone disks 4022*b* and 4032*b*). In accordance with one or more embodiments of the present invention, initially, anchor 5022 points to (or identifies) master (or template) disk 4012. Then, anchor 5022 is updated as revisions to master (or template) disk 4012 are configured, tested and deemed ready for deployment. Different from the embodiment shown in FIG. 5A however, clone computers 4020 and 4030 of FIG. 5B optionally save previous versions of software disks (i.e., clone disks 4022 and 4032) after the software disks are updated to versions 4022*b* and 4032*b*, respectively.

Figure 3:
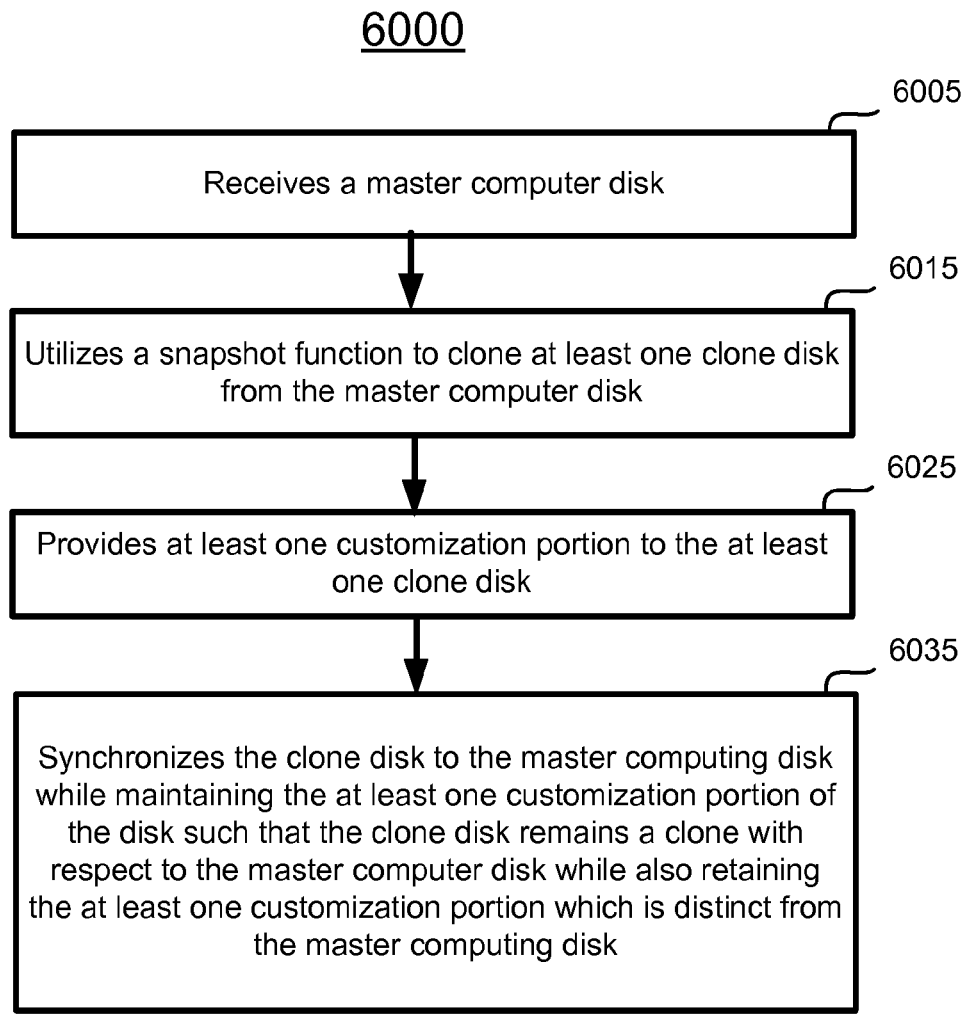
FIG. 3 is a flow diagram of a method for synchronizing and customizing a clone (or primary) disk from a master (or template) disk in accordance with one or more embodiments of the present invention.

FIG. 3 shows flow diagram 6000 of a method for synchronizing and customizing a clone (or primary) disk in accordance with one or more embodiments of the present invention. One or more embodiments of the present invention provide synchronization and customization functionality between a primary disk ("a software disk") referred to as a master (or template) disk and a clone (or primary disk) of one or more computers that are cloned from the master (or template) disk. The clone computers, which can be either physical or virtual computers, are generally configured to store user data on a network or on private data disks that are not affected by the synchronization and customization operations. In accordance with one or more embodiments of the present invention, controller 700 executes the method illustrated by flow diagram 6000.

Flow diagram 6000 includes processes that, in various embodiments, are carried out by a physical or virtual computer. Although specific embodiments are disclosed in flow diagram 6000, such embodiments are exemplary. That is, one or more embodiments of the present invention may include variations of operations embodiments recited in flow diagram 6000. It is appreciated that one or more of the operations in flow diagram 6000 may be performed in an order different from that presented, may be performed manually, and that not all of the operations in flow diagram 6000 may be performed.

At step 6005 of FIG. 3, a system administrator installs controller software (for controller 700) and management console software (for management console 710) on controlling computer system 400 (referring to FIG. 2), which installation process creates a database in accordance with any one of a number of methods that are well known to those of ordinary skill in the art. In accordance with one or more embodiments, the system administrator uses management console 710 to bind the controller software to a specific computer management server (CMS) and/or storage management server (SMS), or a combined CMS/SMS in accordance with any one of a number of methods that are well known to those of ordinary skill in the art. Using credentials entered by the system administrator, controller 700 communicates with the CMS/SMS to discover compute and storage resources in accordance with any one of a number of methods that are well known to those of ordinary skill in the art. The credentials and discovered inventory are saved in the database, and the inventory may be displayed, for example, using a user interface of management console in accordance with any one of a number of methods that are well known to those of ordinary skill in the art.

Next, in accordance with one or more embodiments, the system administrator, or the like, uses management console 710 to create one or more master (or template) disks in accordance with any one of a number of methods that are well known to those of ordinary skill in the art. In general, a master (or template) disk can be created from a disk and an existing computer that is present in an environment managed by the CMS/SMS. For example, and without limitation, appropriate disk and computer identifiers are submitted to the CMS/SMS either textually or graphically. It is possible for a combined CMS/SMS to manage a computer and its disks as a single unit, in which case, the system administrator can enter a unit identifier and controller 700 will automatically determine the individual actual computer and disk identifiers from the CMS. For example, VMware VirtualCenter software (available from VMware, Inc. of Palo Alto, Calif.) manages virtual machines, and each virtual machine has a unique identifier and information about its virtual devices, including virtual disks.

In accordance with one or more embodiments of the present invention, management console 710 also enables the system administrator to create a new master (or template) disk and/or actual computer, and to create a master computer associated with the master (or template) disk from the new resources. To do this, controller 700 submits appropriate requests to the CMS/SMS to have the requested resources allocated or created. In accordance with one or more embodiments of the present invention, controller 700 may serve as the master computer, and in other embodiments, another computer may serve as the master computer.

Once a master (or template) disk is created, the system administrator is free to modify its contents, for example and without limitation, by activating the master computer; this means powering on the master computer associated with the master (or template) disk, and running software on it. In accordance with one or more embodiments of the present invention, the system administrator can power on, and control the master computer remotely using management console 710 to forward a power-on request to the CMS. The system administrator can also interact directly with the master computer through a mouse, keyboard and screen (MKS) interface provided by the CMS or the master computer hardware itself. A system administrator usually runs the master computer to perform software installation, upgrade and maintenance.

As shown at step 6015, in accordance with one or more embodiments, when the system administrator is satisfied with the current software configuration of the master (or template) disk, the system administrator, using management console 710, instructs controller 700 to take a snapshot of the master (or template) disk. Controller 700, in turn, forwards this request to either the SMS or CMS over communications technology 730, whichever one is responsible for managing disk snapshots. As is well known, disk snapshot management is typically an SMS feature. In accordance with one or more embodiments, a snapshot is a logical point-in-time copy of a disk, and a snapshot operation splits a disk into two revisions: a "before" revision representing a frozen state at snapshot time (for example, master (or template) disk 4012 shown in FIG. 5A), and an "after" revision that captures all subsequent modifications to the disk (for example, master (or template) disk 4012*b* shown in FIG. 5A). The two revisions represent two nodes in a revision graph (for example, in revision graph 5012 shown in FIG. 5A) for the master (or template) disk. To provide near-instantaneous snapshot creation, and to save storage space through sharing of common blocks, snapshots usually employ copy-on-write technology—as is well known, copy-on-write can be implemented in either hardware or software. Further, there are two approaches to creating a snapshot that are commonly used by virtual machine managers, i.e., an undo log approach, commonly used by hardware such as disk arrays, and a redo log approach.

As shown in FIG. 5A, revision graph 5012 follows a "redo log" model of copy-on-write snapshots wherein a particular node of revision graph 5012 contains changes to a disk relative to a point-in-time state represented by its parent node 4012. This means that when child node 4012*b* is created from parent node 4012, parent node 4012 can no longer be modified, since it represents a stable state. Consequently, only leaf nodes (i.e., nodes with no children) can be modified. If a user requests a writable disk snapshot based on a non-leaf node, the controller creates a new leaf node "branched" from the non-leaf node. The non-leaf node now has two or more children, and therefore the revision graph begins to look like a tree.

As mentioned above, storage devices managed by an SMS implement copy-on-write snapshots using either a "redo log" or an "undo log" approach. The two approaches differ in their implementation, but are equivalent in functionality, and one can be transformed to model the other. If the redo log approach is used, then nodes of revision graphs utilized in embodiments of the present invention can be mapped directly to actual snapshots exposed by storage devices. In accordance with one or more embodiments of the present invention, for the case of undo logs, controller 700 transparently manages actual snapshots, and translates them into the redo log model exposed to end users.

In accordance with one or more embodiments of the present invention, the system administrator uses management console 710 to create and set up database items referred to as clone groups and clone computers. One setting for a clone group is its anchor. If the system administrator configures a fixed anchor, the management console lets the administrator browse existing master (or template) disks and their revision graphs to select a stable (i.e. non-leaf) snapshot to which to synchronize clone computers in the clone group. The anchor will remain attached to that revision (i.e., snapshot) until it is explicitly relocated through management console 710. To configure the anchor as floating, the system administrator selects a node on a desired branch of the revision graph, and controller 700 automatically sets the anchor to the most up-to-date stable snapshot of that branch. This node is the immediate ancestor (i.e., parent) of the node at the branch's extremity. The anchor remains attached to that revision (i.e., snapshot) until a new revision is added to the extremity of the branch, at which point the anchor is automatically relocated to the next stable node on the branch.

In accordance with one or more further embodiments, the anchor is a fixed anchor, and controller 700 provides a browser interface in accordance with any one of a number of methods that are well known to those of ordinary skill in the art so that a user can browse master (or template) disks and their revision graphs to select a particular stable (for example, non-leaf) snapshot (for example, revision disk 4012*b* shown in FIG. 5A) for synchronizing the user's clone computer (for example, clone computer 4020 shown in FIG. 5A). In accordance with one or more such further embodiments, the anchor will remain attached to revision disk 4012*b* until clone disk 4022 is synchronized with revision disk 4012b. In accordance with one or more still further embodiments, the anchor is a floating anchor and a change in the floating anchor automatically causes controller 700 to perform a synchronizing operation between the master (or template) disk and clone computer(s) without requiring explicit direction. In accordance with one or more such still further embodiments, if the anchor is configured as floating, the system administrator selects a node on a desired branch of the revision graph, and controller 700 automatically sets the anchor to the most up-to-date stable snapshot of that branch. In one example, referring to FIG. 5A, node 4012*b* is the immediate ancestor (parent) of node 4012 at the branch's extremity. In accordance with one embodiment, the anchor (anchor 5022 in FIG. 5A) remains attached to that revision 4012*b* until a new revision 4012*c*, added to the extremity of the branch, is stabilized. At that time, the anchor is automatically relocated to the next stable node 4012c on the branch.

Once a clone group is created, the system administrator can add clone computers to the clone group in accordance with any one of a number of methods that are well known to those of ordinary skill in the art. For example, to create a new clone computer entry, in accordance with one or more embodiments of the present invention, the system administrator specifies: (a) a clone group ("CG") to which the new clone computer belongs (if no CGs currently exist, management console 710 offers an opportunity to create one and assign it a name at this time); (b) the number of secondary disks the clone computer should have, if any (every secondary disk can be specified as an existing disk managed by the SMS, or as a new disk to be created by the SMS); and (b) customization properties. Customization properties of the new clone computer include, for example and without limitation: (a) hostname; (b) network settings such as IP address(es), DNS/DHCP servers, etc; (c) security ID; and (d) authentication domain membership. If a customization property is configured to be dynamic, the system administrator will specify rules for generating its value at synchronization time.

In accordance with one or more embodiments of the present invention, initial synchronization occurs when a clone group is created and saved for the first time. The anchor of the clone group changes manually (by relocating a fixed anchor) or automatically (whenever a new master (or template) disk revision is added to a branch containing a floating anchor). In accordance with one or more embodiments of the present invention, if a clone computer is added to a previously synchronized group, only the new clone computer is synchronized. In any case, whether the first time a group of clone computers is synchronized, or the first time a clone computer is added to a previously synchronized clone group, in accordance with one or more embodiments of the present invention, controller 700 communicates with the CMS/SMS to set up the actual clone computer(s) to be used with the clone disk(s). To do this, for each clone computer in the clone group, controller 700 creates the clone (or primary) disk of the clone computer using, for example and without limitation, one of two methods, depending on capabilities of the SMS, the storage devices the SMS manages, and any preferences configured by the system administrator: (a) create as a new copy-on-write snapshot, i.e., the clone (or primary) disk is the master (or template) snapshot selected by the anchor; or (b) create as a full snapshot. Some storage devices have an ability to create a full and independent copy of an existing disk quickly. This technology has several names, including "business continuity volume (BCV)," "split mirror," or "independent snapshot." Unless secondary disks on the clone computer(s) have already been created or allocated, controller 700 creates or allocates the secondary disks as specified by the clone computer's settings in its database entry. Unless the actual hardware (physical or virtual) has already been assigned, controller 700 instructs the CMS to allocate or create the actual computer hardware (virtual or physical), and then assigns it to this clone computer.

At step 6025 of FIG. 3, in accordance with one or more embodiments, a customization portion is provided to each clone (or primary) disk. As described herein, the customization portion may include customizable properties including, but not limited to, one or more of: host name, IP address(es), security identifiers, authentication domain membership, software license keys, and user selected preferences. Then, controller 700 enables offline customization (to be described below) or sets up deferred online customization (to be described below) on the clone (or primary) disk. In accordance with one or more embodiments of the present invention, a system administrator will set up clone computer software and a network environment so that a user's data and personal settings are stored either on the network or on one of the clone computer's secondary disks. Modifications that a user makes to the clone (or primary) disk are considered temporary, i.e., they are stored in a snapshot, and may become lost at the next synchronization, since the snapshot may get deleted and replaced with a newer one. In contrast, user modifications to secondary (or data) disks are preserved across synchronization operations.

At step 6035 of FIG. 3, in accordance with one or more embodiments, and referring to FIG. 5A, clone (or primary) disk 4022 of clone computer 4020 is synchronized to master (or template) disk 4012b of master computer 4010 while maintaining customization portion of clone (or primary) disk 4022.

After a clone computer (for example, clone computer 4020 shown in FIG. 5A) is synchronized, the customization portion of the clone (or primary) disk is customized. In general, customization of the newly synchronized clone (or primary) disk is performed either offline, for example, before the clone computer powers on and boots, or online, for example, inside the clone computer as it is powered on and booting.

Customization: Some operating systems such as UNIX can be configured to obtain most run-time system settings such as hostname, authentication domain, IP address, and password database from a few central servers over a network at boot time. For a clone computer configured with such an operating system, its primary (or clone) disk does not generally contain information specific to the clone computer. Therefore, replacing the clone (or primary) disk with a new version is safe. Other operating systems, such as Windows XP, however, store some system settings on the primary (or clone) disk, so the replacement operation is destructive to those system settings. Also, there is an additional complexity in that some system settings configure networking, therefore the operating system cannot reliably obtain those system settings from the network while it is booting, since its ability to communicate on the network depends on the system settings being correctly set (i.e., a classical chicken-and-egg problem). In accordance with one or more embodiments of the present invention, this issue is resolved by storing a copy of the system settings outside of the clone computers (for example, in the database entry for the clone computer), and then re-applying the system settings to the clone (or primary) disk every time it is regenerated. This process is referred to herein as customization.

In accordance with one or more embodiments of the present invention, controller 700 initiates customization for a clone computer after synchronizing it, i.e., synchronizing its clone (or primary) disk. During customization, each system setting is customized either offline, i.e. before the clone computer powers on and boots, or online, i.e. inside the clone computer as it is powered on and is booting. Online customization generally involves running one or more scripts or programs (for example, such scripts may be provided by the system administrator and are installed in accordance with any one of a number of methods that are well known to those of ordinary skill in the art or they can be installed by a user) inside the clone computer shortly after it has powered on and while it is booting. In accordance with one or more embodiments of the present invention, the scripts/programs read customization properties from a data source, and then apply them to the appropriate devices or operating system settings in accordance with any one of a number of methods that are well known to those of ordinary skill in the art. In accordance with one or more embodiments of the present invention, online customization is supported by having controller 700 set up one of the following data sources, depending on the capabilities of the CMS and the compute resources it manages in accordance with any one of a number of methods that are well known to those of ordinary skill in the art: (a) a floppy disk (in this case, the customization scripts/programs read the system settings from files stored on a floppy disk; this requires that the actual computer hardware support remote floppy devices or virtual floppy disks (for virtual machines); (b) a secondary disk (in this case, the customization scripts/programs read the system settings from files stored in predetermined location(s) on secondary disk(s) that are private to the clone computer); and (c) an alternate communication channel (in this case, some types of computer hardware support a communication channel between software running inside the clone computer and an external environment; this communication channel is independent of a standard IP network, and thus does not need to be set up—for example, a backdoor device of a virtual machine (VM) obtained from VMware, Inc. of Palo Alto, Calif. allows software inside an active VM to read a file residing outside the VM such as, for example, a file in a file system belonging to a physical server hosting the VM).

If online customization is enabled by a system administrator, and the CMS and actual computer hardware associated with a clone computer supports one of the data sources listed above, controller 700 sets up an appropriate data source after synchronization to enable customization to succeed when the clone computer is next powered on in accordance with any one of a number of methods that are well known to those of ordinary skill in the art. For example and without limitation, for a clone virtual machine, controller 700 can format a virtual floppy disk, load it with the customization parameters obtained, for example and without limitation, from database 720, and attach the virtual floppy disk to the clone VM. Online customization has issues in some instances. In particular, for example: (a) the actual computer hardware may not support the data sources or communications mechanisms needed to supply the system settings to the customization scripts/programs; (b) applying some system settings to an operating system while it is booting may require a reboot for the new system settings to take effect—this can happen if the customization scripts/programs run too late in the boot process, for example, when customization scripts/programs change the hostname of a Windows computer, the operating system may need to reboot one more time for the new hostname to take effect; (c) online customization requires the operating system to be able to boot correctly, and this may not be possible if driver software and configuration settings contained in the master (or template) disk are incompatible with the actual computer hardware associated with the clone computer—if the clone computer is unable to boot, it is essentially unusable.

Offline customization resolves the above-identified issues. Offline customization involves modifying the contents of a newly generated clone (or primary) disk before the clone computer boots from it. Offline customization: (a) does not require special communication channels or data sources; (b) applies system settings directly by modifying configuration files of an operating system before the operating system boots (as such, the new system settings will be in effect at first boot—this avoids time-consuming reboots); and (c) solves hardware compatibility issues by optionally reconfiguring driver software and system settings of the operating system to match the new hardware before the operating system boots (driver reconfiguration may involve copying missing driver files from a repository into the file system, and editing some OS configuration files to enable those drivers). In accordance with one or more embodiments of the present invention, offline customization is implemented as follows. First, controller 700 logically connects the clone (or primary) disk to an offline customizer computer configured in database 720 in accordance with any one of a number of methods that are well known to those of ordinary skill in the art; specific details of logically connecting depend on the nature of the clone disk, and the offline customizer computer. If, for example, the clone disk is a SCSI device, controller 700 establishes a TCP network connection between the offline customizer computer and the SCSI device. However, if the clone disk is a LUN from a disk array on a SAN, controller 700 may need to communicate with the SMS to enable a data path between the LUN and an HBA device of the offline customizer computer. Second, controller 700 arranges for the operating system of the offline customizer computer to detect the clone disk as a new block device—this device detection relies on the presence of the correct disk driver in the operating system of the offline customizer computer. In particular, device detection may or may not be automatic, depending on the type of operating system used. If device detection is not automatic, controller 700 sends the operating system a message instructing it to actively scan for new devices. If the clone (or primary) disk is a virtual disk file (such as the .vmdk file of a VMware virtual machine), and the offline customizer computer is a physical computer, controller 700 will use a virtual disk driver to expose the virtual disk file as a block device to the operating system. Third, controller 700 causes the offline customizer computer to mount the file systems of the clone (or primary) disk; this is possible provided the operating system is equipped with the correct file system driver. If so, controller 700 will request the operating system to mount the file systems of the clone (or primary) disk using a standard operating system call interface. In response, this causes the file system driver to expose folders and files of the clone (or primary) disk to application software on the offline customizer computer. The offline customizer computer application software then modifies the necessary configuration files and/or drivers on the clone (or primary) disk to: (a) directly apply the system settings specified in the clone computer's database entry in database 720; for example, in the Linux operating system, the hostname that the clone computer will assign itself can be set by editing the /etc/hostname file; and (b) optionally, create and insert scripts into the file system for deferred online customization. Optionally, the offline customizer computer application software reconfigures the driver software and system settings to enable the operating system to boot on the actual hardware associated with the clone computer. The driver reconfiguration may involve copying missing driver files from a repository into the file system, and editing some OS configuration files to enable those drivers. Fourth, the offline customizer computer application software modifies configuration files containing system settings, and optionally modifies the driver configuration. Fifth, the offline customizer computer application software unmounts the file systems, and signals controller 700. In response, controller 700 logically disconnects the clone disk from the offline customizer computer.

In accordance with one or more further embodiments of the present invention, offline customization can be used to set up online customization. This may be done by inserting customization scripts and/or programs into the clone disk's file system. This may be useful in resolving some limitations of traditional online customization such as, for example and without limitation, data source or specialized communications channel requirements. In accordance with one or more embodiments of the present invention, online customization can be used to apply certain settings to clone computers such as, for example and without limitation, joining the clone computers to an authentication domain, while offline customization can be used to apply other settings to the clone computers such as, for example and without limitation, hostname and IP. As such, one or more embodiments of the present invention may use a combination of online and offline customization.

Finally, once a clone computer has been synchronized and customized successfully, end-users are free to use it, for example, by powering on the clone computer's actual computer, and interacting with it.

Subsequent synchronization or re-synchronization occurs when a clone group needs to be synchronized due, for example, to an anchor change. To do this, controller 700 must regenerate each clone (or primary) disk from the new anchor in a safe manner, i.e. with no harmful end-user impact or loss of data. However, when a clone computer is currently active, i.e. its actual computer is powered on, its primary disk cannot be deleted or replaced since it is currently being accessed by the clone computer—for example, software applications may be running with unsaved user data still residing in memory. Replacing the primary disk without the computer's knowledge might cause it to crash, resulting in data loss. To address this issue, controller 700 discovers through the CMS which of the clone computers are active, and sends one or more notifications over a network to software running on the clone computers. In accordance with one or more embodiments of the present invention, a first type of notification attempts to get an end-user's attention by flashing a message or playing a sound on the computer's display, or the like. For example, the message may request the end-user to save any outstanding data, close software applications, and log off or shut down the computer at the earliest convenient time. Many standard operating systems and/or software applications expose a mechanism for sending and broadcasting end-user-visible messages, and controller 700 uses such a mechanism to send the notification. Examples of such mechanisms include, without limitation, Microsoft Windows' Messenger service, and America Online's Instant Messenger service. After a predetermined period of time, and depending on policies set by the system administrator, if a clone computer is still active, controller 700 optionally forces the clone computer to shut down in an orderly way by sending a "log off" or "shut down" request to the operating system loaded on the clone computer. In response to this request, the operating system usually instructs active programs to close, flushes its memory caches, logs off the current end-user, and optionally switches the clone computer off. However, if, after a predetermined period of time, and depending on policies set by the system administrator, if the clone computer still has not shut down or its end-user has not logged off (possibly because of a bug, an uncooperating user, an unexpected delay, or a crash in the software), controller 700 optionally instructs the CMS to perform a hardware-initiated power-off of the clone computer. Once a clone computer is inactive, controller 700 resynchronizes it by regenerating and customizing its clone (or primary) disk from the new master (or template) snapshot as described above. In accordance with one or more embodiments of the present invention, controller 700 does not wait for an active clone computer to shut down to create its new clone (or primary) disk. Controller 700 can create and customize the new clone (or primary) disk while the active clone computer is still using the old one. Then, once the clone computer is inactive, controller 700 switches the clone (or primary) disk from the old one to the new one, and the old one is then either deleted or saved, depending on a backup policy (described in detail below).

Backup policy: In accordance with one or more embodiments, a system administrator can specify a backup policy for a group of clone computers (for example, clone computers 4020 and 4030 shown in FIG. 5B) or for each individual clone computer. In accordance with one or more such embodiments, the backup policy determines whether the clone (or primary) disk (for example, clone disks 4022 and 4032 shown in FIG. 5B) is backed up during resynchronization. Backing up a clone or primary (or primary) disk protects against accidental loss of data or software that a user might mistakenly have saved to the clone (or primary) disk instead of to a secondary disk (for example, secondary disks 4024 and 4034 shown in FIG. 5B).

In accordance with one or more embodiments of the present invention, the backup policy uses a numerical setting N to indicate how many backups should be kept. For example, at any given time, controller 700 keeps up to N copies of primary disks associated with a clone computer where N≧1. When a new primary disk is generated, and N backups already exist, controller 700 causes the oldest one to be deleted. In this example, the value N=1 means that there are no backups, and only the latest primary disk snapshot is kept.

In accordance with one or more such embodiments of the present invention, the system administrator is able to browse a list of clone (or primary) disk backups for a clone computer in accordance with any one of a number of methods that are well known to those of ordinary skill in the art, and can choose to switch the clone (or primary) disk to a particular version still available in the set of N backups. Note that there is no need to customize a switched-in primary disk (for example, clone (or primary) disk 4022 shown in FIG. 5B) since it was customized when it was first synchronized.

To illustrate the above, refer to FIG. 5B which shows a clone group comprised of clone computers 4020 and 4030 with floating anchor 5022 that tracks the current stable revision of the main branch of master (or template) revision graph 5012. Initially, anchor 5022 pointed to master (or template) disk 4012b, and clone computers 4020 and 4030 were configured with: (a) clone (or primary) disks 4022 and 4032, respectively, that were synchronized with master (or template) disk 4012b; (b) and secondary disks 4024 and 4034, respectively, that are used as data disks. Then, after the system administrator modifies the master (or template) disk, and produces revision disks 4012c and 4012d, assume that revision disk 4012c becomes the most up-to-date stable revision of revision graph 5012. As such, controller 700 will, for example, automatically cause anchor 5022 to point to master (or template) disk 4012c. Then, the above-described synchronization process synchronizes and customizes clone (or primary) disks 4022b and 4032b using master (or template) disk 4012c, and reconfigures clone computers 4020 and 4030 to switch to clone (or primary) disks 4022b and 4032b, respectively. In addition, old clone (or primary) disks 4022 and 4032 are saved as backups in accordance with any one of a number of methods that are well known to those of ordinary skill in the art. As discussed above, data disks 4024 and 4034 are not affected by the synchronization process.

Although a data disk may be a full disk, it may be useful to use a snapshot function to create lightweight backups of the data disk, with each snapshot representing a particular point in time in the disk's history. For example, backing up old versions of data is useful when a user accidentally, or purposefully, deletes a personal file. However, the use of snapshots for backup of the data disk is different from using a snapshot function for cloning because there is no master (or template disk). Thus, a revision tree of the data disk, if backup is enabled, belongs to the clone computer. As such, the tree will typically be linear, and snapshots will be created independently of synchronization operations of the primary (or clone) disk.

It is appreciated that embodiments of the present invention can be used to advantage in both hosted and non-hosted VMs, in partially virtualized systems, and in VMs with any number of physical and/or logical virtualized processors. Moreover, elements of the invention may be implemented partially in hardware, for example in processor architectures intended to provide hardware support for virtual machines.

Unless specifically stated otherwise as apparent from the following discussions, it is appreciated that throughout the present detailed description, discussions utilizing terms such as "receiving", "converting", "providing", "configuring", "synthesizing", "translating", "formatting", "implementing", "displaying", "operating", "reducing", "notifying", "communicating", "requesting", "performing", "utilizing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical computers.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, virtual machine (VM) or "guest" 200 is installed on a "host platform," or simply a "host," which includes system hardware, that is, hardware platform 100 of computer system 700, and one or more layers or co-resident components comprising system-level software, such as an operating system or similar kernel, or a virtual machine monitor or hypervisor (see below), or some combination of these. System hardware 100 typically includes one or more processors 110, memory 130, some form of mass storage 140, and various other devices 170. Additionally, an operating system, such as Commercial Operating System 420, and hosted application(s) 430, are shown with an optional coupling to system hardware 100.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM 200 may be implemented in software using known techniques to emulate the corresponding physical components. Guest system software 202 includes guest operating system (OS) 220 and drivers 224, as needed for the various virtual devices 270.

Note that VM 200 may be configured with more than one virtualized processor, for example, FIG. 1, illustrates multiple virtual processors VCPU0 210-0, VCPU1 210-1, . . . , VCPUm 210-m. Embodiments described herein may be used regardless of the type of multi-threading—physical and/or logical—or the number of processors included in a VM.

The design and operation of virtual machines, such as VM 200, are well known in the field of computer science.

Some interface is generally required between guest software within VM 200 and various hardware components and devices in underlying system hardware platform 100. This interface—which may be referred to generally as "virtualization software"—may include one or more software components and/or layers, possibly including one or more software components known as "virtual machine monitors" (VMMs) (for example, VMM 300, . . . , VMM 300-n shown in FIG. 1), "hypervisors," or virtualization "kernels" 600. Because virtualization terminology has evolved over time and has not yet become fully standardized, these terms do not always provide clear distinctions between software layers and the components to which they refer. For example, the term "hypervisor" is often used to describe both VMM 300 and kernel 600 together, either as separate but cooperating components or with one or more of VMM 300, . . . , VMM 300-m incorporated wholly or partially into kernel 600 itself; however, the term "hypervisor" is sometimes used instead to mean some variant of a virtual machine monitor alone, which interfaces with some other software layer(s) or component(s) to support the virtualization. Moreover, in some systems, some virtualization code is included in at least one "superior" VM 200 to facilitate the operations of other VMs. Furthermore, specific software support for virtual machines may be included in the host OS itself. Unless otherwise indicated, the embodiments of the present invention described above may be used in virtualized computer systems having any type or configuration of virtualization software.

FIG. 1 shows VMM 300, . . . , VMM 300-n as being separate entities from other components of the virtualization software. Although some software components used to implement one or more embodiments of the present invention are shown and described as being within a "virtualization layer" that is located logically between all virtual machines and the underlying hardware platform and/or system-level host software, this virtualization layer can be considered part of the overall virtualization software (although it would be possible to implement at least part of this layer in specialized hardware). Again, unless otherwise indicated or apparent from the description, it is to be assumed that one or more embodiments of the present invention can be implemented anywhere within the overall structure of the virtualization software, and even in systems that provide specific hardware support for virtualization.

Various virtualized hardware components in VM 200, such as virtual CPU(s) VCPU0 210-0, . . . , VCPUm 210-m, virtual memory 230, virtual disk 240, and virtual device(s) 270, are shown as being part of VM 200 for the sake of conceptual simplicity. In actuality, these "components" are usually implemented as software emulations 330 included in VMM 300. In such an arrangement the VMM may (but need not) be set up to expose "generic" devices, which facilitates VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. The term "full virtualization" is sometimes used to denote a system in which no software components are included in the guest other than those that would be found in a non-virtualized computer; thus, guest OS 220 could be an off-the-shelf, commercially available OS with no components included specifically to support use in a virtualized environment. In contrast, the term "para-virtualization" is sometimes used to denote a system wherein the guest is configured to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that guest OS 220 (in particular, its kernel) is specifically designed to support such an interface. According to this view, having, for example, an off-the-shelf version of Microsoft Windows XP as guest OS 220 would not be consistent with the term para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular term of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002). As illustrated in FIG. 1, in many cases, VMMs 300, . . . , 300-*n* are deployed on top of a software layer—kernel 600—constructed specifically to provide efficient support for VMs 200, . . . , 200-*n*. This configuration is frequently referred to as being "non-hosted." Kernel 600 may also handle other applications running on it that can be separately scheduled, as well as a console operating system that, in some architectures, is used to boot the system and facilitate certain user interactions with the virtualization software. Note that kernel 600 is not the same as a kernel that will be within guest OS 220—as is well known, every operating system has its own kernel. Note also that kernel 600 is part of the "host" platform of the VM/VMM as defined above even though the configuration shown in FIG. 1 is commonly termed "non-hosted"; moreover, the kernel may be both part of the host and part of the virtualization software or "hypervisor." The difference in terminology is one of perspective and definitions that are still evolving in the art of virtualization.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for maintaining synchronization between a master computer disk and a clone disk that comprises:
    maintaining revisions of the master computer disk, wherein one of the revisions includes configurations desirable for a clone group of which a computer utilizing the clone disk is a member;
    associating the revision to the clone group to enable creation of computers in the clone group based on the revision;
    creating the clone disk by requesting a snapshot of the revision of the master computer disk; and
    applying customizations to the clone disk specific to the computer utilizing the clone disk, wherein a representation of the customizations is stored separate from the revisions of the master computer disk and in association with an identity of the computer.

2. The computer implemented method as recited in claim 1 wherein the step of associating the revision utilizes a fixed anchor that does not change without administrator input.

3. The computer implemented method as recited in claim 1 wherein the step of associating the revision utilizes a floating anchor that automatically changes association of the clone group to a subsequently created revision representing a new up-to-date version of the revision.

4. The computer implemented method as recited in claim 1 wherein the customizations include one or more of: host name, IP address(es), security identifiers, authentication domain membership, software license keys, and user selected preferences.

5. The computer implemented method as recited in claim 1 wherein applying the customizations occurs while the computer utilizing the clone disk is offline.

6. The computer implemented method as recited in claim 1 wherein applying the customizations occurs during a booting process by the computer utilizing the clone disk.

7. The computer implemented method as recited in claim 6 wherein applying the customizations further comprises running a script installed in the computer for accessing the stored representation of the customizations.

8. A master/slave synchronization maintainer comprising:
    a template receiver for maintaining revisions of a master computer disk, wherein one of the revisions includes configurations desirable for a clone group of which a computer utilizing a clone disk is a member;
    a clone generator coupled with said template receiver, said clone generator for associating the revision to the clone group to enable creation of computers in the clone group based on the revision and for creating the clone disk from the master computer disk; and
    a clone customizer coupled with said clone generator, said clone customizer for applying customizations to the clone disk specific to the computer utilizing the clone disk, wherein a representation of the customizations is stored separate from the revisions of the master computer disk and in association with an identity of the computer.

9. The master/slave synchronization maintainer as recited in claim 8 wherein the clone generator utilizes a fixed anchor that does not change without administrator input in order to associate the revision to the clone group.

10. The master/slave synchronization maintainer as recited in claim 8 wherein, in order to associate the revision to the clone group, the clone generator utilizes a floating anchor that automatically changes association of the clone group to a subsequently created revision representing a new up-to-date version of the revision.

11. The master/slave synchronization maintainer as recited in claim 8 wherein said customizations include customizable properties selected from the group consisting of: host name, IP address(es), security identifiers, authentication domain membership, software license keys, and user selected preferences.

12. The master/slave synchronization maintainer as recited in claim 8 wherein a snapshot function is utilized by said clone generator to create the clone disk.

13. The master/slave synchronization maintainer as recited in claim 8 wherein at least a portion of applying the customizations by the clone customizer occurs while the computer utilizing the clone disk is online.

14. A non-transitory computer-usable medium having computer-readable program code embodied therein for causing a method for maintaining synchronization between a master computer disk and a clone disk, said method comprising:
  maintaining revisions of the master computer disk, wherein one of the revisions includes configurations desirable for a clone group of which a computer utilizing the clone disk is a member;
  associating the revision to the clone group to enable creation of computers in the clone group based on the revision;
  creating the clone disk by requesting a snapshot of the revision of the master computer disk; and
  applying customizations to the clone disk specific to the computer utilizing the clone disk, wherein a representation of the customizations is stored separate from the revisions of the master computer disk and in association with an identity of the computer.

15. The non-transitory computer-usable medium having computer-readable program code embodied therein as recited in claim 14 wherein the step of associating the revision utilizes an anchor that is selected from the group of anchors including a fixed anchor that does not change without administrator input and a floating anchor that automatically changes association of the clone group to a subsequently created revision representing a new up-to-date version of the revision.

16. The non-transitory computer-usable medium having computer-readable program code embodied therein as recited in claim 14 wherein said customizations include customizable properties selected from the group consisting of: host name, IP address(es), security identifiers, authentication domain membership, software license keys, and user selected preferences.

17. The non-transitory computer-usable medium having computer-readable program code embodied therein as recited in claim 14 wherein at least a portion of applying the customizations occurs while the computer utilizing the clone disk is online.

18. A computer implemented method for maintaining synchronization between a master computer disk and a clone disk that comprises:
  cloning the clone disk from said master computer disk, the clone disk having a customization portion; and
  customizing the customization portion with information relevant to a clone computer that uses the clone disk by, when the clone computer is powered on, waiting for software from the clone disk to load and sending customization information to the software loaded from the clone disk, whereby the clone computer modifies its configuration files.

19. A master/slave synchronization maintainer comprising:
  a template receiver for receiving a master computer disk template;
  a clone generator coupled with said template receiver, said clone generator for cloning at least one slave disk from said master computer disk;
  a clone customizer coupled with said clone generator, said clone customizer for providing at least one customization portion of said at least one slave disk clone; and
  a clone synchronizer coupled with said clone customizer, said clone synchronizer for synchronizing said slave disk to said master computing disk while maintaining said at least one customization portion of said slave disk such that said slave disk remains a clone with respect to said master computer disk while also retaining said at least one customization portion which is distinct from said master computing disk, wherein said synchronizing of said slave disk with respect to said master computing disk provides a go-offline command to a slave software program running on a slave computer loaded from said slave disk after a pre-determined time period has passed since synchronization was available and said slave disk has been offline, and wherein a power down command is provided to said slave computer coupled with said slave disk if said slave software program does not respond to said go-offline command in a pre-determined period of time.

20. A non-transitory computer-usable medium having computer-readable program code embodied therein for causing a method for maintaining synchronization between a master computer disk and a customized slave disk, said method comprising:
  receiving a master computer disk;
  utilizing a snapshot function to clone at least one slave disk from said master computer disk;
  providing at least one customization portion to said at least one slave disk clone;
  tracking changes to said master computing disk;
  providing an anchor for synchronizing said slave disk to said master computing disk when said changes to said master computing disk are recognized without requiring an agent; and
  synchronizing said slave disk to said master computing disk when said slave disk is offline while maintaining said at least one customization portion of said slave disk such that said slave disk remains a clone with respect to said master computer disk while also retaining said at least one customization portion which is distinct from said master computing disk, wherein said synchronizing further comprises providing a go offline command to a slave software program on a slave computer loaded from said slave disk after a pre-determined time period has passed since synchronization was available and said slave disk has not been offline, and providing a power down command to said slave computer coupled with said slave disk if said slave software program does not respond to said go-offline command in a pre-determined period of time.

\* \* \* \* \*